United States Patent [19]
Schmidt

[11] 4,111,768
[45] Sep. 5, 1978

[54] METHOD OF SEPARATING SOLIDS FROM A FLUID SYSTEM

[75] Inventor: Ferenc J. Schmidt, Ardmore, Pa.

[73] Assignee: Ametek, Inc., Paoli, Pa.

[21] Appl. No.: 769,031

[22] Filed: Feb. 16, 1977

Related U.S. Application Data

[63] Continuation-in-part of Ser. No. 601,253, Aug. 4, 1975, Pat. No. 4,053,386, and Ser. No. 515,915, Oct. 18, 1974, Pat. No. 4,014,767.

[51] Int. Cl.² .............................................. B03C 5/00
[52] U.S. Cl. ................................... 204/151; 204/149; 204/152; 204/302
[58] Field of Search .................. 204/149, 152, 180 R, 204/186, 188, 151, 306, 302, 268; 210/243

[56] References Cited

U.S. PATENT DOCUMENTS

| 799,605 | 9/1905 | Lester ............................... 204/302 X |
| 1,603,298 | 10/1926 | Speed ............................... 204/151 X |
| 2,573,967 | 11/1951 | Hamlin ............................. 204/302 X |
| 3,679,565 | 7/1972 | Gilchrist .......................... 204/152 X |
| 3,761,383 | 9/1973 | Backhurst et al. ................... 204/268 |
| 3,799,853 | 3/1974 | Carlin ................................... 204/149 |

*Primary Examiner*—Arthur C. Prescott
*Attorney, Agent, or Firm*—Miller & Prestia

[57] ABSTRACT

Method for the electrolytic separation of colloidally suspended material from a fluid system and compositions for using such method to recover such materials.

21 Claims, 5 Drawing Figures

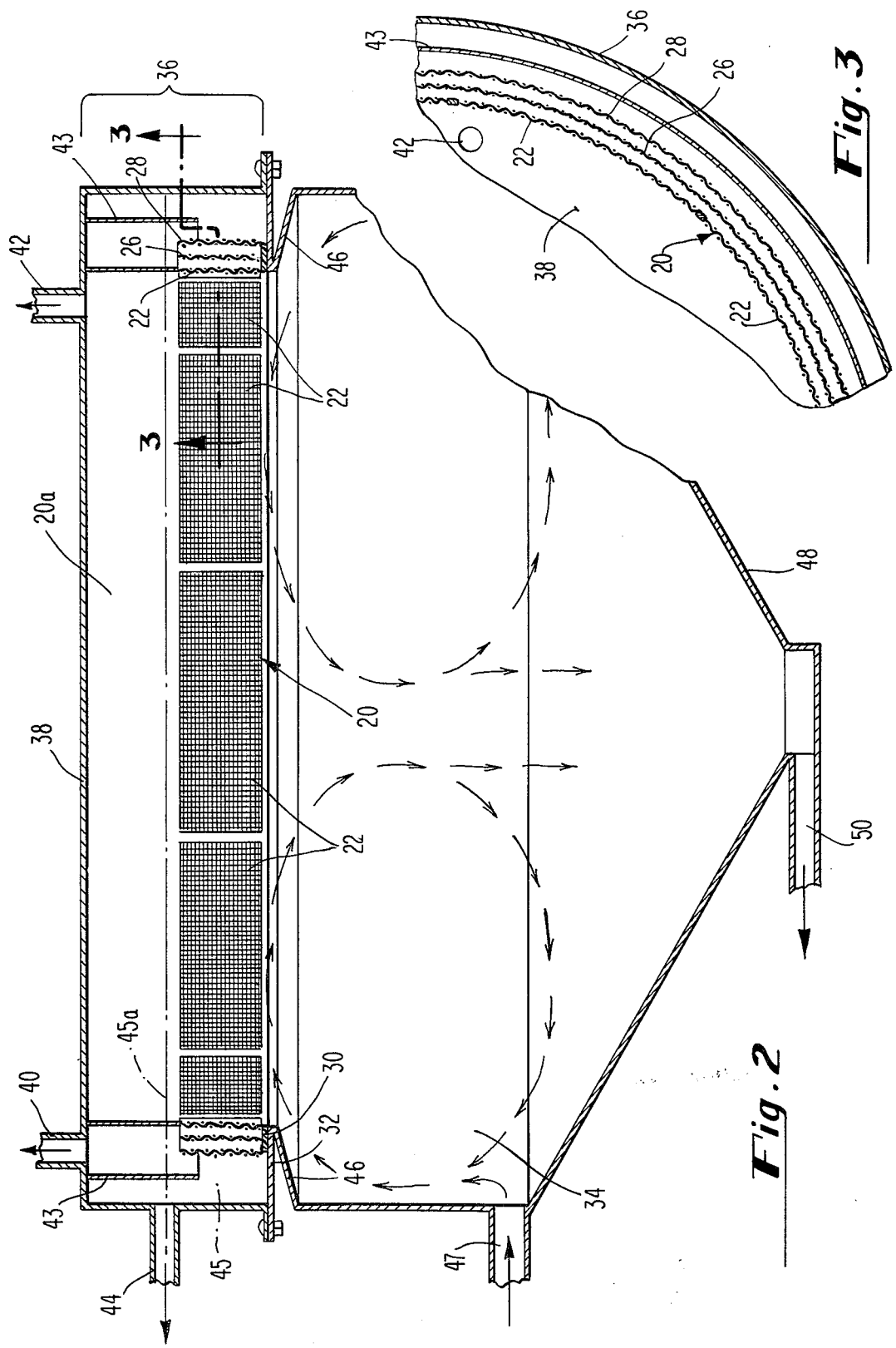

METHOD OF SEPARATING SOLIDS FROM A FLUID SYSTEM

This application is a continuation-in-part of application Ser. No. 515,915 filed Oct. 18, 1974 now U.S. Pat. No. 4,014,767 and application Ser. No. 601,253 filed Aug. 4, 1975 now U.S. Pat. No. 4,053,386, and to the extent it includes non-elected subject matter thereof, this application in effect forms a combined divisional application of the non-elected subject matter of each of said applications. Application Ser. No. 601,253 is also a continuation-in-part of application Ser. No. 515,915, filed Oct. 18, 1974, of common inventorship and assignment herewith.

This invention pertains to a method for separating colloidally suspended materials from a fluid system and to compositions for using such a method to recover and/or to remove these materials from dilute suspensions. The materials referred to include finely divided or colloidal suspensions of materials such as silver and gold, or poisonous and/or noisome residue from pesticide or herbicide manufacturing processes.

These prior applications disclose an electrolytic filter, used in the filtration of digested sewage effluent and they describe the possible application of such a filter for concentrating other colloidally suspended materials or for removing or reclaiming colloidally suspended materials from other electrolytic solutions, such as waste sugar or potato processing solutions and refinery wastes. The present application is directed to improved methods in the use of such filters and to novel compositions for use in combination therewith. Such compositions and methods have been found to be particularly effective in recovering colloidal metallic particles from suspensions thereof. Such suspensions of silver and gold particles are produced, by reduction of metal ions to metals, in waste solutions. Such methods have also been found to be particularly effective for removing environmentally objectionable residue from the effluent of certain types of herbicide and pesticide manufacturing processes.

Heretofore, the recovery of a colloidal metal from treated waste solutions has been accomplished with only limited effectiveness and efficiency, primarily by time consuming and cumbersome settling and/or filtering steps. With respect to pesticide and herbicide wastes, present practice often involves burying such wastes rather than treating them.

The general object of the present invention is to provide a more effective method for reclaiming or removing such valuable or objectionable materials and particularly for filtering other charge-bearing colloids or flocs thereof.

A more specific object of this invention is to provide such a method for use with a highly effective and efficient effluent filtration means which may be operated at high efficiency for extended periods of time.

These objects, and others which will become apparent in the subsequent description of this invention, are met by a process utilizing an electrolytic filter comprising two electrolytic conductive perforated members, electrically insulated from one another and usually separated by a liquid-pervious, gas bubble immpervious, electrically non-conductive separator. An electrolytic solution containing the material to be filtered is passed through the first of these conductive members and then sequentially through the separator and the second conductive member while an electrolytic voltage, depending largely on the anode-cathode distance, on the order of 4–30 volts and an electrolytic current, on the order of $\frac{1}{2}$ – 20 amps per square foot electrode area is established between the first conductive member (the cathode) and the second conductive member (the anode). Preferably, the solution enters a chamber through an inlet positioned near the bottom of the negatively charged first perforated member, flows upward towards this perforated member which evolves hydrogen gas bubbles; this gas evolution imparts additional velocity to the solid particles present and establishes a toroidal circulation pattern aiding in the agglomeration and return of the flocculated particles to the bottom of the chamber.

As applied in the recovery of colloidal silver particles from a suspension thereof produced by borohydride sodium hydroxide ($BH_3$ in sodium hydroxide) treatment, the electrolytic solution consists of the treated waste solution together with floc-forming calcium hydroxide (although other alkaline earth metal hydroxides or iron hydroxide or aluminum hydroxide and indeed other alkaline earth metal or iron salts may be used) and negative charge imparting additives, particularly phosphates such as $NaH_2PO_4$ and an anionic resin flocculating agent, such as Magnifloc 835a, a commercial product of the American Cyanamide Company of Bound Brook, New Jersey.

The process of the present invention can also be used most effectively with a self-contained toilet and waste treatment system comprising, in addition to the toilet, a flushing means and a waste treatment chamber, including comminuted redwood filter and digestion medium, and a final filter for treating the effluent of the digestion media. The final filter, which is itself a separate aspect of the present invention, comprises a pair of porous electrically conductive, generally metallic, elements spaced apart from one another and separated by a gas bubble impervious porous material, such as sand. The first of the sheet metallic elements through which the effluent passes acts as a filter. For that purpose, a fine mesh screen is preferred.

According to the present invention, in the filtering of electrolytic liquids in which is suspended colloidal materials to be filtered therefrom, an electrolytic current is passed between the spaced apart metallic elements by the establishment of an electrical potential. Gas evolution at the filter element, hydrogen in the case of water as the electrolytic fluid to be filtered, displaces the non-charged filter cake material collecting on the filter element which would otherwise clog it in a short period of time, thus providing a self-cleaning filter. Since the formation of hydrogen bubbles occur at the crater tops of each perforation on the screen, these bubbles partially block the perforations, effectively making the screen openings smaller. Also, since the colloidal particles in sewage and other organic materials, such as pesticide and herbicide manufacturing effluents, are carriers of a naturally induced negative charge, such particles are repelled from the vicinity of the negative, hydrogen evolving, screen. Due to such considerations, the filtration capability of the screen is considerably greater than warranted by the screen pore size alone.

The hydrogen evolution also produces a relatively high pH which is conducive to flocculation and settling of the displaced sludge and colloidal material. In one form of this invention, the collected and concentrated sludge material in sewage waste treatment is returned to a redwood digestion chamber producing an activated sludge effect and enhancing the digestion efficiency of the chamber. At the second metallic element, oxygen and chlorine are evolved, producing an oxidizing, chlorinating and sterilizing effect tending to purify the water adjacent to the second metallic element and essentially neutralizing the pH. The effluent water may then be recycled to the flushing medium of the waste treatment system.

In one form of the present invention, the process is carried out in a recycling toilet system utilizing a waste treatment chamber comprising a plurality of vertically displaced horizontally disposed trays with overflow weirs and passageways on each of the trays such that the effluent passes through each of the trays and through redwood chips contained therein and overflows weirs surrounding the passageways to the next lower tray, from which it passes through another opening, horizontally displaced from those above and below it, in a similar manner.

In another embodiment of the present invention, the process proceeds utilizing a final effluent filter consisting of a cylindrical chamber with a conical bottom, in which the first and second metallic elements, consisting of metallic screens, are disposed in cylindrical form on a common axis, the second element being smaller in diameter than the first. Sand is disposed between the metallic elements and the first metallic element consists of a screen of 400 mesh or finer. Effluent enters the chamber near the outer walls of the chamber and passes inwardly through the first metallic element, wherein it is filtered, then through the inorganic, gas-impervious porous separator material, typically sand, and through the second metallic element and into a central collection chamber, from which it is returned to a reservoir for use in flushing.

The preferred embodiment of this invention is that in which the method and apparatus of this invention are applied to remove poisonous and/or objectionable residues and chemicals from pesticide and herbicide manufacturing process effluents. Such effluents may be treated in particular for the removal of carbamate residues, mercaptans, alkyl disulfides, amines and other materials exerting a chemical oxidation demand.

This invention may be better understood by reference to the following detailed description thereof, taken in conjunction with the appended claims, and the figures, in which:

FIG. 2 is a schematic view of the assembled electrode-separator assembly and container therefor, used in connection with a particular embodiment of the present invention;

FIG. 3 is a top view of the electrode-separator assembly of the electrolytic filter shown in FIG. 2;

Figure 1:
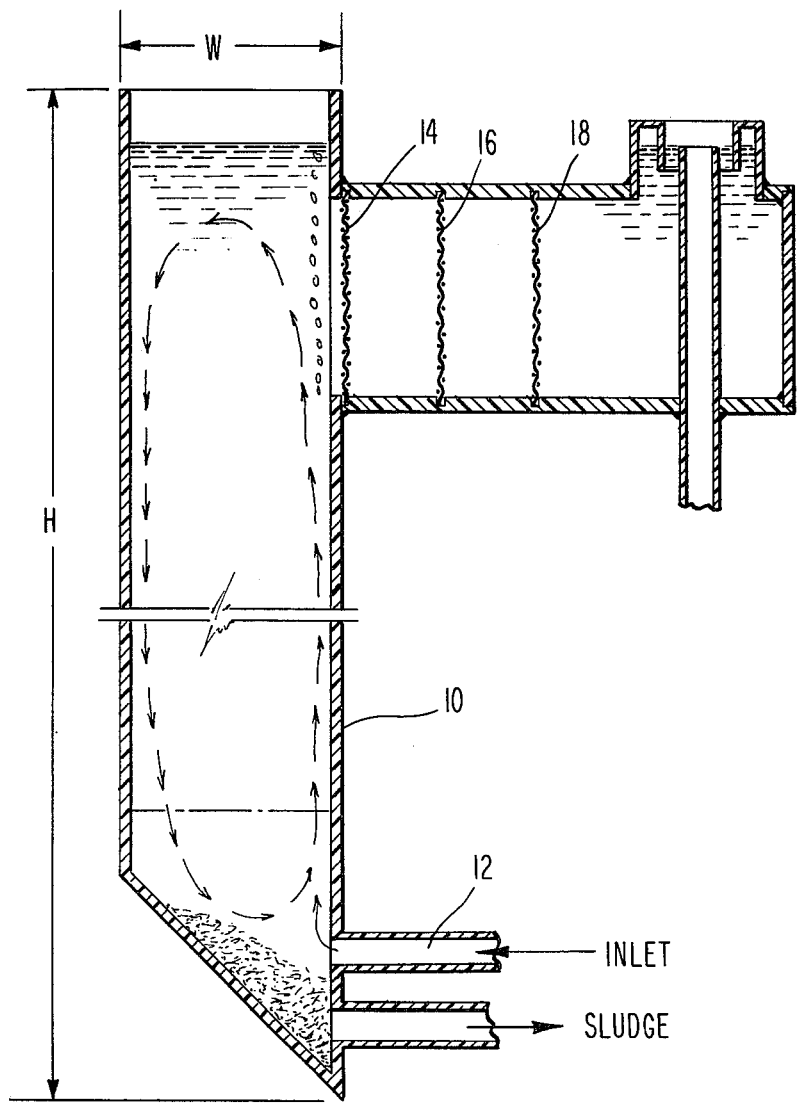
FIG. 1 is a cross-sectional view of a test apparatus used in demonstrating the process of the present invention. (This apparatus uses overly great anode-cathode distance to permit more convenient study of the filtering mechanism.)

The process of the present invention as applied to the recovery of colloidally suspended materials will be seen by referring more specifically to FIG. 1, wherein there is shown a sloped bottom receiving container 10 with an inlet 12 for introducing an electrolytic solution with suspended material to be removed therefrom and passing it up partially through and above the settling area to a first porous conductive member 14, constituting the cathode of an electrolytic cell, and thence sequentially through a porous, liquid-pervious, gas bubble impervious polypropylene sheet separator 16 and a second porous conductive member 18, constituting the anode of the electrolytic cell of this invention, and preferably consisting of carbon, lead dioxide, magnetite, platinum, ruthenium oxide, or coatings of these materials on supporting substrates, such as titanium or tantalum. The first electrode or cathode may consist of any conductive material not attacked by the alkaline environment, such as steel. The filtration action takes place at or near the cathode, but the openings therein need not necessarily be smaller than the dimensions of the suspended particles to be removed due to the electrolytic action of the filter.

In the case of one micron or smaller diameter colloidal silver in suspension, the use of 400 mesh metal screens as a non-electrolytic filter still permits passage of these particles through such filter elements. (In case of slimy sewage, clogging occurs within minutes with such a screen.) In the present invention, the first electrode may have a pore size substantially larger than the particles, on the order of 1/16th of an inch in dimension, which is about 10,000 times the particles size of the colloidal metal particles to be filtered.

In the test cell shown in FIG. 1, the sloped bottom receiving container is approximately 20 inches high, 5-¾ inches deep and 3 inches wide (in the dimensions seen in FIG. 1). The electrodes and electrode housing are disposed near the top of the twenty-inch height and this circular screen electrode comprises approximately 1/17th of a square foot. (Note: Square and rectangular cross-sections have been used successfully also.) In this test cell, electrolytic solution is introduced at a rate of 400 cubic centimeters per minute. With a 10-volt potential across the 2½ inch anode-cathode distance and one amp electrolytic current, effective removal of colloidal silver is obtained. The residual silver content in the effluent is less than twenty parts per billion, well below the maximum level endorsed by environmental authorities. It should be noted that these voltages are substantially below those used in electrostatic filters in which polar repulsion is relied upon to assist in the filtering action. Such electrostatic filters require a higher voltage gradient, generally above 100 volts per centimeter, and no significant current is established, since the fluids used are generally not conductive or only weakly conductive between electrodes. With calcium chloride in the electrolytic solution of this invention, calcium hydroxide forms at the cathode, and chlorine and oxygen are produced at the anode and the solution is self-neutralizing which prevents excessive hydroxyl build-up. Enhanced flocculation of colloids and growth of floc size is produced at the cathode by localized high hydroxyl concentrations and by the toroidal flow pattern established due to the electrolytic action.

In a preferred embodiment of the electrolytic solution of the present invention, particularly for the removal of colloidal silver from silver ion-containing waste waters, the electrolytic solution comprises the colloidal metal suspension which is derived from an aqueous solution of silver ions through reduction by a borohydride-sodium hydroxide reducer, and alkaline earth metal hydroxide solution, together with a flocculating agent which attaches itself to the colloidal silver particles, and additional negative charge imparting flocculating agent, such as anionic resin flocculating agent.

Generally, the borohydride comprises about 1.5 to 5 times the stoichiometric amount required to reduce the metallic ion to be recovered and the remainder of the solution comprises, per liter of solution from which the metal is to be recovered, 5-30 (preferably about 15) ml 1N sodium hydroxide, 0.1-5.0 (preferably about ⅔) gram calcium chloride which converts to calcium hydroxide in solution, 0.1-2.0 (preferably about ½) gram $NaH_2PO_4$ and 0.1-2.0 (preferably about ¼ gram) of anionic resin flocculating agent.

Turning now to FIGS. 2 and 3, there is seen an inner annular ring or cylinder of stainless steel sheet 20 with stainless steel screen windows 22. Gas bubble impervious, liquid pervious separator, comprised of porous polyethylene sheet 26 is disposed just outward of cathode screen 20 and outward of separator 26 is anode screen 28, which consists of platinum or platinum group metal oxide-coated titanium. An upper section 20a of cathode 20 prevents the combination of oxygen, chlorine and hydrogen gases evolved at the two electrodes from recombining, possibly in an explosive manner. (This could also be prevented by blowing air or some other gas across the top of the electrolyte to prevent the evolving gases from reaching their explosive concentrations.) Cathode 20 and anode screen 28 are separated by an insulated mounting block 30.

Cathode 20, separator 26, anode screen 28 and separator 30 together comprise the electrode assembly which rests on shield 32 in filter container 34, seen in FIG. 2. A top section 36 of electrolytic filter container 34 includes a top cover 38 with vents 40 and 42 disposed generally over electrodes 20 and 28 on either side of upper cathode section 20a. Top section 36 also includes a downwardly extending baffle or weir 43 of non-conductive material preventing foam on the gas evolving surface 45a of electrolytic solution 45 from passing through outlet 44. Outlet 44 is provided for the removal of filtrate, after it has been introduced through inlet 47 and passed through the electrolytic filter screen elements in container 34. Container 34 also includes frustoconic baffle 46 which aids in the establishment of the toroidal circulation pattern and prevents the build-up of gases below shelf 32. At the bottom of container 34 is a conical solids collecting section 48 and sludge outlet 50. Electrolytic solution containing the suspended material to be filtered is introduced to container 34 through inlet 47 where it rises towards the hydrogen evolving screen 20 where the solids experience an increase in velocity and assume the toroidal circulation pattern shown by arrows in FIG. 2. The clear liquid or filtrate passes through cathode 20 and into the center section of the electrode assembly, then through anode 28 and out through outlet 44. Recovery of the toroidally circulating solids is enhanced by the adhesion of the circulating flocs to the sludge already collected in the frustoconic settling area and by the horizontal zone of abrupt pH increase below the cathode 20 caused by diffusion of hydroxide ions from the cathode in the counter-current direction. Container 34, particularly top section 36 provides, above outlet 44, a gas collection space in communication with vents 40 and 42 to prevent any dangerous build-up of gases produced by electrolytic action in the filter.

Such gas collection spaces, vents, electrode separators and gas separators as are described with respect to the filter as shown in FIGS. 2 and 3 may be omitted if sufficient air or other inert gas is circulated at or near the space into which the electrolytically produced gases evolve in order to dilute these gases below their explosive concentrations.

It should also be noted that the perforated metal cathode 20 serves as a non-electrolytic filter for larger particles, thus acting as a fail safe filter mechanism, as required by certain state regulations, in the event of failure of the electrolytic filtering action of the filter of this invention.

In a process utilizing an electrolytic filter of the type shown in FIGS. 2 and 3, with a container diameter of 38 inches and a cathode or inner electrode diameter of 32 inches and with an electrode height of 3 inches and a solids circulating height, above conical solids collection bottom section, of 10 inches, a through-put of colloidal silver particle-containing solution of composition as described above, on the order of 2-5 gallons per minute was obtained. From tests in the FIG. 1 test cell it has been shown that a through-put of 2 gallons per square foot of electrode area per minute is easily attainable. It is quite clear that it is not merely an electrostatic effect which contributes to the filtering action of this invention. The linear flow rate of filtration through the filter is more than thirty times the velocity of charged particles which could be expected due to electrostatic effects and also is more than three times the settling velocity of the suspended material.

It is apparent then that some unexplained electrolytic effect, or a combination of several known effects are contributing to the effectiveness of the process. By way of comparison, while deep bed filters generally handle a through-put of ½ gallon per square foot of filter area, the process utilizing the electrolytic filter described has shown itself to be capable of handling a through-put of over 2 gallons per square foot of filter area per minute.

As indicated above, the technical phenomenon upon which the electrolytic filtering action is based while not completely understood, may be partially explained on the basis of localized high pH in the immediate vicinity of the cathode which "shocks out" the colloidal suspended metal particles. This may also be reinforced by the mechanical effects of bubbles produced in the first electrode, where the filtering action is governed, which tends to close down the effective pore size, the bubbles functioning themselves as a mechanical filter. Thus, evolving gas bubbles clinging to the filter screen openings may act as a fine mesh screen which is not subject to clogging, as ordinary fine mesh screens are. It is clear that the evolving gas bubbles do knock off filter cake, as it accumulates during operation without simultaneous flow of electric current, and prevent clogging.

The vertical toroidal circulating action, caused by cell geometry and by the velocity imparting action of the gas bubbles also enhances the filtering action and eliminates the flotation to and the collection at the surface of the flocs, as is practiced in the electro-flotation process. In one test in which cell geometry prevented the establishment of the toroidal circulating pattern — while the electrolytic conditions remained the same — the filtering action deteriorated at flow rates in excess of ½ gallon per square foot per minute. Otherwise, the gas bubbles rise at a velocity of approximately 4 inches per second, visibly accelerating the solids parallel to the filter screen. Furthermore, localized heating at the cathode surface, due to passage of current, likely causes the formation of toroids within the general toroidal flow pattern, thus aiding the growth of flocs.

The hydroxyl ions generated at the cathode make the vicinity of the cathode much more strongly alkaline than the bulk of the solution. These ions diffuse quite rapidly, at a rate of about 2.5–3 centimeters per minute. They form a horizontal layer just below the vertical screen. Much of the flocculation and floc growth occurs in this layer and the calcium chloride in the silver recovery process, described above, flocculates as calcium hydroxide at this interface. An additional benefit is obtained therefore in that calcium build-up on the screen, as is a problem in other processes, is avoided. Additives and pH in the present system also contribute to the formation and growth of flocs. This growth of floc can be visually observed. The growth and settling of flocs may be aided by the particle discharge of the polar particles at the cathode which makes the settling rate much higher than would be otherwise predictable from Stokes' Law. The additives in the electrolytic solution in the present invention render the suspended particles negatively charged which may contribute to the electrolytic filtering action and electrostatic effect.

Large particles are of course subject to mechanical filtration in the screen electrode elements and the evolution of chlorine or oxygen at the anode in certain filtrates, such as sewage effluent, is effective in disinfecting the effluent and destruction of wetting agents found in some silver containing solutions or photographic fixers. However, sulfate ion may be used to render the solution conductive if the evolution of chlorine is undesirable.

Figure 4:
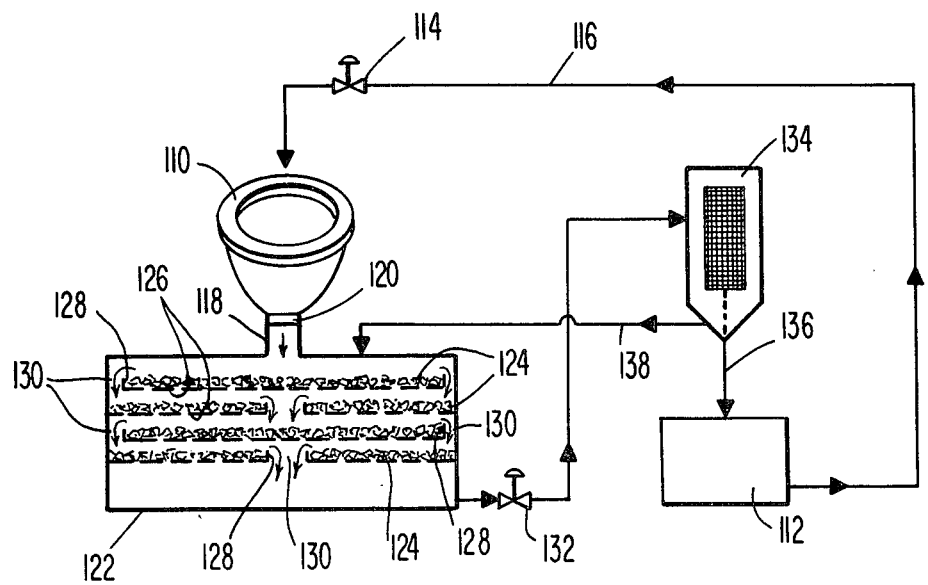
FIG. 4 is a schematic illustration of a self-contained waste disposal system used in connection with the process of the present invention.

In connection with the application of the present process to a recycling toilet and waste disposal system, reference should be made to FIG. 4, wherein there is shown a toilet 110, a flush reservoir 112, a flush valve 114, and a flush inlet line 116 comprising a water flushing means for toilet 110 and a toilet drain 118 with outlet valve 120 therein. In communication with toilet 110 through drain line 118 is a waste treatment chamber 122 housing a plurality of horizontally disposed vertically displaced perforated bottom trays 124, each having a bed of comminuted redwood or redwood chips 126 disposed thereon. Each tray 124 includes overflow weirs 128 adjacent downwardly opening passageways 130. Passageways 130 in vertically adjacent trays are horizontally displaced from one another so that liquid effluent introduced into a particular tray at first passes through the redwood chips and the perforated tray bottom, but once this passage clogs, it gradually overflows to a lower tray through which it passes first vertically and, after clogging, horizontally before overflowing that tray to the next succeeding tray. In effect, treatment chamber 122 comprises a trickle filter wherein comminuted redwood is used as a filter media. At the same time, the redwood filter media acts as a digestion medium in that waste and effluent passing through the trickle filter is subjected to the decaying action of bacteria causing digestion of the sludge therein and conversion of solid waste products to liquid effluent.

While other comminuted materials may serve as the trickle filter media and provide a multiplicity of sites for the bacterial digestive action in treatment chamber 122, redwood is preferred due to its resistance to deterioration.

Effluent passing through the bottom tray in treatment chamber 122 passes through filter feed control valve 132 and is pumped to self-cleaning filter 134. From self-cleaning filter 134 pure filtered effluent passes through filter outlet line 136, either to an effluent outlet or, alternatively and preferably, to flush reservoir 112 for recirculation in the system as the flushing medium. Collected solids, actually a concentrated sludge material from filter 134, passes through sludge outlet line 138 back to treatment chamber 122 and particularly to the top most tray therein, wherein the bacterial activity in the filtered sludge from the effluent serves as an activator enhancing the digestive effectiveness of the bacteria in treatment trays 124 of treatment chamber 122 in a manner similar to activated sludge waste treatment processes often used in commercial sewage treatment plants. Thus, a more efficient and effective digestion process contributes to the overall effectiveness and efficiency of the self-contained toilet and waste treatment system.

Figure 5:
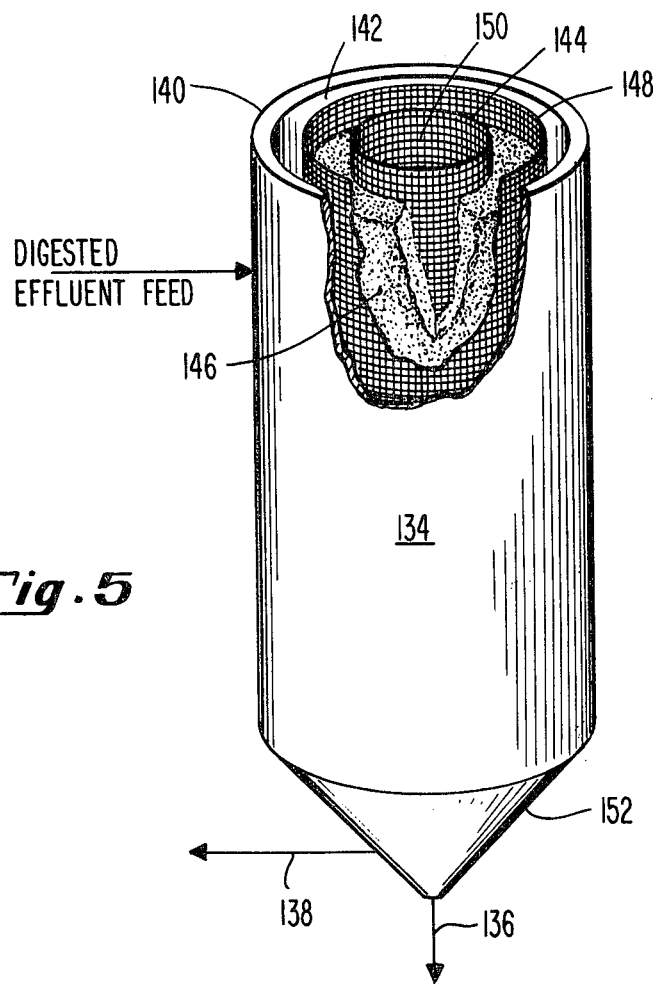
FIG. 5 is a perspective view, partially cut away, of the unique self-cleaning filter used in connection with the process of the present invention.

An important aspect of the efficiency and effectiveness of the present process when used in connection with a self-contained waste treatment system is seen in more detail in FIG. 5.

In FIG. 5, self-cleaning filter 134 is seen to consist of a cylindrical housing 40 surrounding an annular inlet space 142 into which the digested effluent feed from treatment chamber 122 is introduced. Inwardly of inlet space 142 is disposed a first porous electrically conductive, generally metallic, element 144, preferably a fine mesh metal screen of 400 mesh or finer, also referred to as filter element 144. A coated metal base screen and/or a metal coated screen may also serve as filter element 144. Adjacent filter element 144 is an electrically nonconductive (generally nonmetallic and inorganic), gas bubble impervious porous space material 146, such as sand. Inwardly of spacer material 146 is disposed a second porous sheet, electrically conductive, generally metallic, element 148, preferably also a metal screen or a coated screen in which either the base or the coating is metallic. A central effluent outlet space 150 is disposed at the axis of filter 134. At the bottom of housing 140 is a conical enclosure 152 in communication with inlet space 142 for collection of sludge material settling therefrom from which the settled solid material is removed from the filter through line 138. Central effluent collection space 150 communicates downwardly through conical enclosure 152 to permit removal of filtered effluent through outlet line 136.

Filter 134 also includes means, not shown, for imposing an electrical potential between metallic elements 144 and 148, more particularly passing an electrolytic current therebetween, with the first or outer metallic element, the filter element 144, having a negative charge and acting as a cathode and the second, inner element 148 having a positive charge and acting as the anode.

In a preferred mode of the operation, an electrical potential of 5–30 volts, preferably about 10 volts, is imposed between a filter element 144, consisting of 400 mesh stainless steel screen, and second metallic element 148, a screen consisting of a lead dioxide coated titanium base, to produce hydrogen evolution at filter element 144 and oxygen and chlorine evolution at inner element 148. Hydrogen evolving at filter element 144, at an effective pressure of about 100 PSI, tends to dislodge the solid or semi-solid filtered material collecting on filter element 144, and induces flocculation which causes these separated suspended solids to settle to the bottom of enclosure 140. This settling action is enhanced by the increased pH brought about by the hydrogen evolution in the inlet space 142 of filter 134, and by repulsion of fine natural colloids from the negatively charged screen.

Along with oxygen, chlorine, present in the system from salt in urine, is evolved at the inner or second metallic element 148. The combined effect of the evolution of these is to oxidize any remaining color bodies and solid materials in the filtered liquid effluent and also to chlorinate the solution; this chlorination, together with the bactericidal effect of the electrolytic current, eliminates bacterial activity. Further, evolution of these gases tends to lower the pH of the filtered effluent back decolorization and disinfection of the filtered effluent is highly effective. Faster flow rates and lower current are useful in providing a self-cleaning filter if less decolorization and disinfection is tolerable in the system.

As an example of the outstanding results obtainable in the self-contained toilet waste treatment system of this invention, a system including the filter described in the foregoing paragraph, operated at 10 volts and 4 amps, in combination with a redwood chip trickle filter chamber, as described above, has been tested for treatment effectiveness on typical human waste sewage with the following results as shown in the Table:

TABLE

| Raw Sewage to Trickle Filter | | Trickle Filter Effluent to Final Filter | Effluent from Final Filter | |
|---|---|---|---|---|
| Biological Oxygen Demand | 6300 ppm* | 700 ppm | 10 ppm | All within current EPA standards for discharge to natural waterways |
| Chemical Oxygen Demand | 14,200 ppm | 2100 ppm | 21 ppm | |
| Coliform (most probable number per 100 ml) | >100,000,000 | 1,000,000 | 0 | |
| Color | Brown | Brown | None | |
| Suspended Solids | Not Tested | 990 ppm | 13 ppm | |
| Odor | Not Tested | Not Tested | None | |

*parts per million to near neutral. Thus, the filtered, chlorinated, oxidized liquid effluent is ideally suited for re-use in the flushing medium of a self-contained recycling waste treatment system.

In general, the second or inner, metallic or electrically conductive, element 148 may comprise any material combination useful as an anode in the electrolytic production of chlorine. The material used, of course must be electrically conductive and resistant to attack by chlorine and oxygen. Typical of the materials which may be used are carbon, lead dioxide, and precious metals and their oxides or coatings of these materials on supporting substrates. Similarly titanium or tantalum may be used as the base material, although a non-passivating coating, such as platinum or lead dioxide is preferred in combination with such metals.

It should be noted that the present process may find use in applications outside of the waste treatment field, particularly where such applications involve the filtration of an electrolytic fluid either to settle, concentrate or remove from solution difficultly separable colloids or to clarify the liquid in which the colloids are dispensed. Concentrating the colloidal solids for removal or reclamation from waste sugar or potato processing solutions and clarifying the effluent from winery wastes, sometimes known as "still slops", are but a few of the possible applications of this invention.

In a prototype waste disposal system, designed and built for use in connection with the present invention, the first metallic element or filter element 144 consists of approximately one square foot of 400 mesh stainless steel screen. The second element 148 consists of $PbO_2$-coated titanium screen. The sewage waste effluent is passed through the filter at a rate of approximately 3 liters per hour. An electrolytic current of 4 amps is established between the metallic filter elements with a 10 volt potential applied either continuously or for thirty second intervals every ten minutes. With no electrolytic current or voltages established, the filter screen clogs in approximately twenty minutes. Even after clogging, however, flow can be restarted easily with the application of current and the subsequent dislodging of collected solids on the filter member by the hydrogen liberated there. At these treatment rates and conditions, The filtration of sewage effluent, as described in the above referenced parents of the present application, and the reclamation of colloidal metals from waste solutions, particularly borohydride treated silver ion containing waste solutions, are two particularly useful applications of the present invention. Other colloidal metal solutions, such as may be produced by reduction with other chemicals or precipitation with sulfides, etc., may also be treated in accordance with this invention.

Detergents, clays, bauxite, and gold and phosphate ores have also been successfully filtered by the above described method and composition. In the case of clays and bauxite, additional calcium ion, through the addition of clacium chloride, and phosphates were not required. Rather, only the flocculating agents such as the anionic resin flocculating agent described above, or starch was sufficient. This is attributed to the fact that clays, like sewage, already carry a natural negative charge. In the above referenced sewage filtration process, the sewage colloids carry sufficient negative charges to eliminate the necessity of any additional agents, including flocculating agents. Other negatively charged colloidal particles are expected to be similarly filterable. Other non-charged or neutral particles, such as the metallic ions described above, must be occluded in some floc, such as a calcium hydroxide floc described above, and in order effectively to be charged negative charge inducing ions have to be added in order to facilitate their filtration as described herein.

It should also be noted that in the electrolytic filter compositions of this invention, the use of calcium chloride together with soluble phosphates results in the precipitation of calcium phosphate. When this material combines with filtered and collected material, it acts as a flux in the subsequent smelting of the filtered metal to recover metal values. Extraneous phosphates also precipitate together with the calcium; furthermore, ammonia is driven off in the high pH cathodic environment. Thereby two obnoxious pollutants which heavily contribute to growth of algae and eutrophication of waters, are eliminated from the effluent when the filter is used for the recovery of silver from photoprocessing effluents. Moreover, the typical biological oxygen demand of such effluents, generally on the order 100–300 parts per million, is sharply reduced or eliminated in the anodic compartment of this cell, as described in the above referenced patents of this application due to anodic oxidation and evolution of chlorine and/or oxygen. Cyanides are destroyed in the same manner.

In accordance with the preferred embodiment of the present invention, the electrolytic filter and treatment method of this invention have also been found to be highly efficacious for the treatment of pesticide and herbicide manufacturing wastes. Such effluents containing colloidally dispersed residues (such as emulsions) of carbamates, mercaptans, amines, alkyl disulfides and other materials exerting a chemical oxidation demand have been treated in a laboratory cell of the type in FIG. 1, at operating conditions and with results as follows:

EXAMPLE 1

Operating conditions of cell: 70 ml/min (1.1 gph), 1 pass, at 15 amps, of a waste stream containing ethyl mercaptan and diethyl disulfide with chemicals to be comparable to herbicide waste stream.

| Analyses, PPM | COD | Ethyl mercaptan | Diethyl disulfide | Resid. Herbicide |
|---|---|---|---|---|
| Influent to cell | 800 | 506. | 406. | 292 |
| Effluent from cell | 120 | 0.05 | N.D. | 0.01 |

N.D. = non-detectable

EXAMPLE 2

Operating conditions of cell: 140 ml/min (2.2 gph), 1 pass, at 15 amps, of a waste stream as in Example 1.

| Analyses, PPM | COD | Ethyl mercaptan | Diethyl disulfide | Resid. Herbicide |
|---|---|---|---|---|
| Influent to cell | 800 | 506 | 406 | 292 |
| Effluent from cell | 370 | N.D. | N.D. | N.D. |

N.D. = non-detectable

EXAMPLE 3

Operating conditions of cell: 280 ml/min (4.4 gph), 1 pass, at 15 amps, of a waste stream as in Example 1.

| Analyses, PPM | COD | Ethyl mercaptan | Diethyl disulfide | Resid. Herbicide |
|---|---|---|---|---|
| Influent to cell | 800 | 506. | 406. | 292 |
| Effluent from cell | 520 | 0.007 | 1.013 | 0.72 |

EXAMPLE 4

Operating conditions of cell: 70 ml/min (1.1 gph). 1 pass, at 15 amps, of a waste stream, containing diethyl disulfide, dipropyl disulfide, and other chemicals to be comparable to a herbicide waste stream.

| Analyses, PPM | diethyl disulfide | ethylpropyl disulfide |
|---|---|---|
| Influent to cell | 0.4 | 0.2 |
| Effluent from cell | 0.01 | N.D. |

| dipropyl disulfide | Residual Herbicide #1 | Residual Herbicide #2 |
|---|---|---|
| 0.2 | 19. | 0.3 |
| 0.3 | N.D. | N.D. |

N.D. = non-detectable

Similar results have also been noted in treatment of carbamate residues in the waste effluent from certain commercial carbamate herbicide manufacturing processes. In each case the poisonous residues, including ethyl mercaptan, each disulfide cited in Example 4, and amines, have been reduced to practically nil in the output stream from the cell. Significant reduction in chemical oxidation demand was also achieved.

While this invention has been described with respect to specific embodiments and examples, it should be understood that this invention is not limited to these embodiments. The appended claims are intended to be construed to encompass all forms of the invention, including variations and modifications which may be made by those skilled in the art without departing from its true spirit and scope.

I claim:

1. Method of concentrating and separating from electrolytic aqueous solution colloidally suspended, finely divided, difficultly separable material, said method comprising passing said solution in combination with said colloidal suspension sequentially through a first porous sheet electrically conductive filter member and thereafter through a gas bubble-impervious, electrically non-conductive separator material and then a second porous sheet electrically conductive member while imposing an electrical potential between said members and establishing an electrolytic current therebetween with the first of said members having a negative charge and acting as a cathode and the second of said members having a positive charge and acting as an anode.

2. Method as recited in claim 1, wherein said filter member is a metallic screen of 400 mesh or finer.

3. Method as recited in claim 1, wherein said solution to be treated comprises a sewage solution.

4. Method as recited in claim 1, wherein said solution to be treated comprises a waste sugar solution.

5. Method as recited in claim 1, wherein said solution to be treated comprises winery "still slop".

6. Method as recited in claim 1, wherein said solution to be treated comprises food processing industry effluent.

7. Method as recited in claim 1, wherein said solution to be treated comprises a waste stream including colloidally suspended alkyl disulfide.

8. Method as recited in claim 1, wherein said solution to be treated comprises a waste stream including ethyl mercaptan.

9. Method as recited in claim 1, wherein said solution to be treated comprises a waste stream including colloidally suspended carbamate residue.

10. A process for the treatment of an electrolytic fluid waste containing finely divided suspended material, said process comprising passing said waste through a first porous sheet electrically conductive filter member and thereafter through a gas bubble-impervious, electrically non-conductive separator material and then a second porous sheet electrically conductive member while imposing an electrical potential between said members and establishing an electrolytic current therebetween with the first of said members having a negative charge and acting as a cathode and the second of said members having a positive charge and acting as an anode, whereby said finally divided suspended material is filtered from said fluid waste and collected prior to passing through said first porous member and other constituents of said waste's stream are chemically treated by reaction with electrolytically evolved gases at said second porous sheet member.

11. In a process for the treatment of waste in a waste treatment system consisting of a toilet, a water flushing means and a waste treatment chamber comprising a comminuted redwood waste filter and digestion medium, the improvement comprising further filtering the liquid effluent from said waste treatment chamber through a final filter consisting of first and second porous sheet electrically conductive elements spaced apart from one another with a gas bubble impervious porous non-metallic spacer material between said elements, causing an electrolytic liquid to flow successively through said first conductive element, said porous non-metallic spacer material and said second conductive element, causing an electrolytic current to flow between said element with said first element as cathode and said second element as anode and thereby causing gas bubbles to be generated at said first element.

12. Method of recovering metal from a dilute colloidal suspension thereof comprising combining said suspension with calcium or iron hydroxides, chlorides or salts, and one or more negative charge imparting additives, and filtering said solution by passing it through a filter as recited in claim 1.

13. Method as recited in claim 12, wherein said negative charge imparting additive is a soluble phosphate.

14. Method as recited in claim 12, wherein said negative charge imparting additive is an anionic wetting agent.

15. Method as recited in claim 12, wherein said additives include soluble phosphates and an anionic resin flocculation agent.

16. Method as recited in claim 12, wherein said negative charge imparting additive is starch and said suspension includes calcium chloride.

17. Method as recited in claim 12, wherein said additives include soluble phosphates and an anionic resin flocculation agent.

18. Method as recited in claim 17, wherein said additives comprise, per liter of suspension from which metal is to be recovered, ¼ gram $NaH_2PO_4$ and ¼ ml. anionic resin flocculation agent.

19. Method as recited in claim 17, wherein said metal is silver.

20. Method as recited in claim 17, wherein said metal is gold.

21. Method of concentrating and separating from electrolytic aqueous solution colloidally suspended, finely divided, difficultly separable material, said method comprising passing said solution in combination with said colloidal suspension sequentially through a first porous sheet electrically conductive filter member and thereafter through a gas bubble-impervious, electrically non-conductive separator material and then a second porous sheet electrically conductive member while imposing an electrical potential between said members and establishing an electrolytic current therebetween with the first of said members having a negative charge and acting as a cathode and the second of said members leaving a positive charge and acting as an anode said difficultly separable material being filtered at the cathode and the liquid effluent passing through said anode being purified by gases electrolytically produced thereat.

* * * * *